United States Patent [19]
Watanabe

[11] Patent Number: 5,791,301
[45] Date of Patent: Aug. 11, 1998

[54] COOLING SYSTEM FOR CONSTRUCTION EQUIPMENT

[75] Inventor: Hirofumi Watanabe, Hiroshima, Japan

[73] Assignee: Kabushiki Kaisha Kobe Seiko Sho, Kobe, Japan

[21] Appl. No.: 787,171

[22] Filed: Jan. 23, 1997

[30] Foreign Application Priority Data

Jan. 24, 1996  [JP]  Japan .................................. 8-031398

[51] Int. Cl.⁶ .......................................... F01P 1/06
[52] U.S. Cl. ............................ 123/41.31; 180/68.2
[58] Field of Search ................... 123/41.31; 180/68.2

[56] References Cited

U.S. PATENT DOCUMENTS 3,788,418  1/1974  Clancy et al. ...................... 180/68.2

FOREIGN PATENT DOCUMENTS

| 0 494 662 | 7/1992 | European Pat. Off. . |
| 0 727 529 | 8/1996 | European Pat. Off. . |
| 2-64716   | 5/1990 | Japan . |
| 4-76930   | 7/1992 | Japan . |
| 6-32434   | 8/1994 | Japan . |
| 7-237458  | 9/1995 | Japan . |

OTHER PUBLICATIONS

Patent Abstracts of Japan, vol. 96, No. 1, Jan. 31, 1996, JP 07 237458, Sep. 12, 1995.

*Primary Examiner*—Noah P. Kamen
*Attorney, Agent, or Firm*—Oblon, Spivak, McClelland, Maier & Neustadt, P.C.

[57] ABSTRACT

Cooling air is drawn in from only a lower opening formed in an upper rotating structure, and control valves for controlling hydraulic actuators are disposed in the flow path of the cooling air. A clearance is formed between an upright plate which is a part of a frame of the upper rotating structure and a side of a hydraulic oil tank which faces the central portion of the upper rotating structure. The clearance is located above the lower opening, so that the cooling air flows along the side face of the hydraulic oil tank. Fixed to the side face of the hydraulic oil tank is a valve stand, and control valves are attached to the valve stand. Thus, the construction is simple and the outside air can be readily drawn into the structure.

5 Claims, 7 Drawing Sheets

5,791,301

COOLING SYSTEM FOR CONSTRUCTION EQUIPMENT

BACKGROUND OF THE INVENTION

1. Field of the Invention

This invention concerns a cooling system for cooling an engine, a hydraulic oil tank and control valves, which are all mounted mainly in construction equipment. More particularly, the construction equipment typically takes the form of a hydraulic excavator or a working vehicle.

2. Discussion of the Background

FIG. 6 is a partial sectional side view of an upper rotating structure of a small-sized excavator, which is disclosed in Japanese Utility Publication No. 32434/94. In an air introducing structure according to the prior art, as shown in FIG. 6, there is formed an air duct 3 for drawing in the outside air from a lower opening 2. The air duct 3 surrounds at least a portion of an oil tank 4 while allowing a portion of the oil tank to be positioned in an air intake clearance 5. FIG. 7 is a cutaway plan view showing the construction of an upper rotating structure 6 of a small-sized excavator which is disclosed in Japanese Patent Laid Open No. 237458/95. FIG. 7 illustrates an air flow control plate 11 in an engine accommodating portion 7. The air flow control plate 11 guides a part of the cooling air, which has passed an engine 8, toward a hydraulic oil tank 10 mounted in a tank accommodating portion 9.

In the conventional air introducing structure, as shown in FIG. 6, the air duct 3 extends past the oil tank 4 from a location beginning at the lower opening 2. The central portion of the interior of the upper rotating structure does not have much unoccupied space. Thus, it is difficult to arrange the air duct 3 in the central portion of the interior of the upper rotating structure. In the conventional structure, as shown in FIG. 7, the air which passes a radiator 12 abuts the air flow control plate 11 and is partially turned back toward the engine accommodating portion 7. Thus, deteriorating the cooling efficiency of the engine 8. Therefore, a satisfactory cooling effect is not attained for the hydraulic oil tank 10.

SUMMARY OF THE INVENTION

It is an object of the present invention to provide a cooling system for construction equipment where the cooling system is simple in structure and capable of introducing therein the outside air.

It is another object of the present invention to provide a cooling system for construction equipment where the cooling system is capable of efficiently cooling a hydraulic oil tank and control valves for controlling hydraulic actuators.

The construction equipment cooling system of the present invention comprises an upper rotating structure. The upper rotating structure includes an engine mounted in a rear portion of the upper rotating structure and having an engine fan; a radiator located near the engine fan; a hydraulic oil tank disposed beside the engine; and control valves for controlling hydraulic actuators, the control valves being disposed on a side of the hydraulic oil tank. A lower opening is formed in an underside of the upper rotating structure and below the control valves. With rotation of the engine fan, air for cooling the control valves is drawn in through the lower opening.

Preferably, a clearance is formed between an upright plate as a member of a frame of the upper rotating structure and the side face of the hydraulic oil tank, and the foregoing lower opening is formed below the clearance.

The cooling system may be designed so that the air for cooling the control valves is supplied only through the aforesaid lower opening. Moreover, the control valves may be attached to a valve stand fixed to the upper rotating structure. Further, a duct may be provided on an exhaust side of the radiator, thereby allowing the air to be discharged through the duct to an exterior of the upper rotating structure.

In the present invention, the air which is induced into the lower opening, by rotation of the engine fan, flows along the side face of the hydraulic oil tank. In this case, the air passes the control valves attached to the side face of the tank. Consequently, the cooling air cools both the hydraulic oil tank and the control valves. Additionally, it is possible to effect maintenance by utilizing the foregoing clearance, thus improving the maintainability.

DESCRIPTION OF A PREFERRED EMBODIMENT

Figure 1:
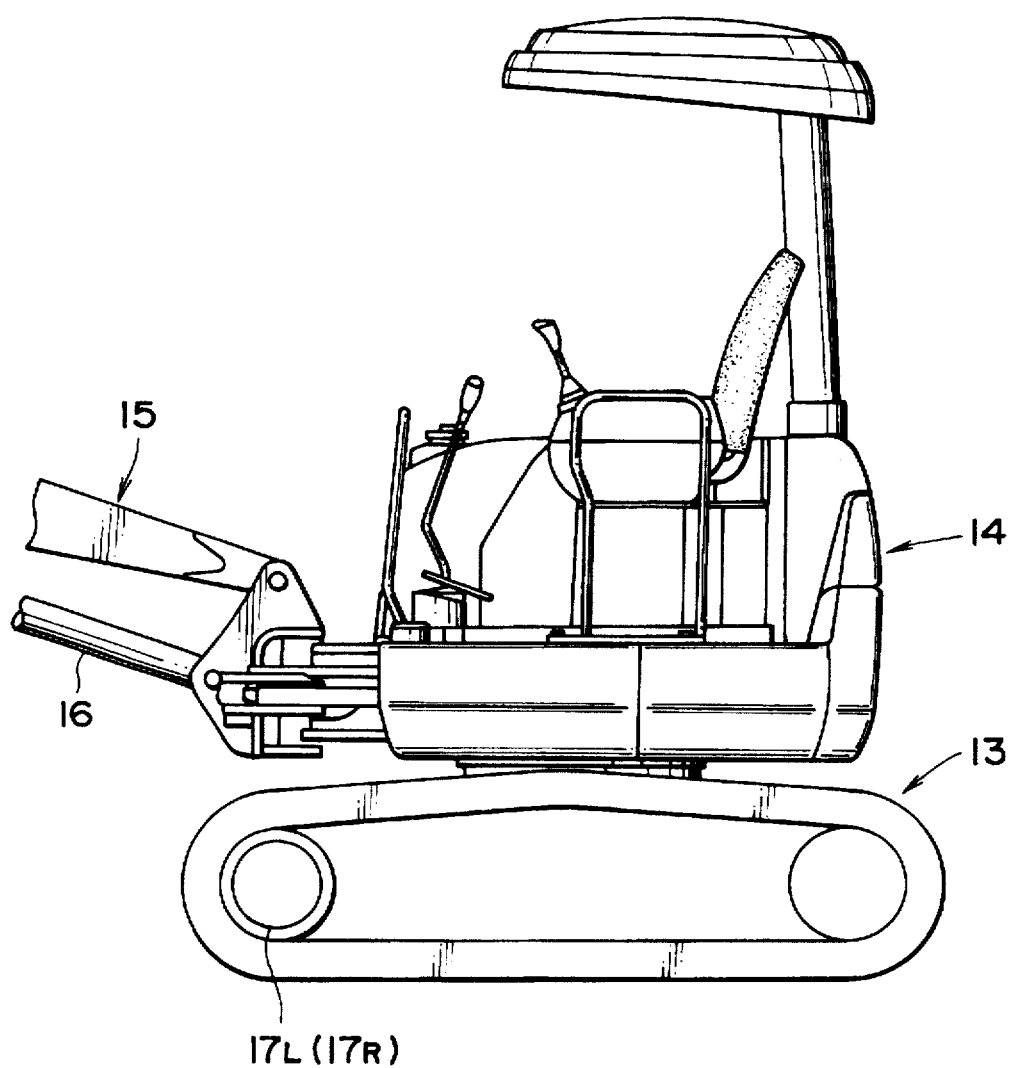
FIG. 1 is a side view of a small-sized hydraulic excavator equipped with a cooling system embodying the present invention.

An embodiment of the present invention will be described in detail with reference to the accompanying drawings. FIG. 1 is a side view of a small-sized excavator equipped with a cooling system (not shown in FIG. 1) embodying the present invention.

In FIG. 1, the reference numeral 13 denotes a lower traveling structure, and the numeral 14 denotes an upper rotating structure. The upper rotating structure 14 is rotatably mounted on the lower traveling structure 13. A working attachment 15 is mounted on a front portion of the upper rotating structure 14. The whole of the attachment 15 is not shown in FIG. 1. A boom cylinder 16 is a hydraulic actuator for actuating the working attachment 15. Left and right traveling motors 17L and 17R are mounted to the lower traveling structure 13 on the left and right sides. The right traveling motor 17R is not shown in the figure because it is located on the opposite side, or hidden side, of the left traveling motor 17L.

Figure 2:
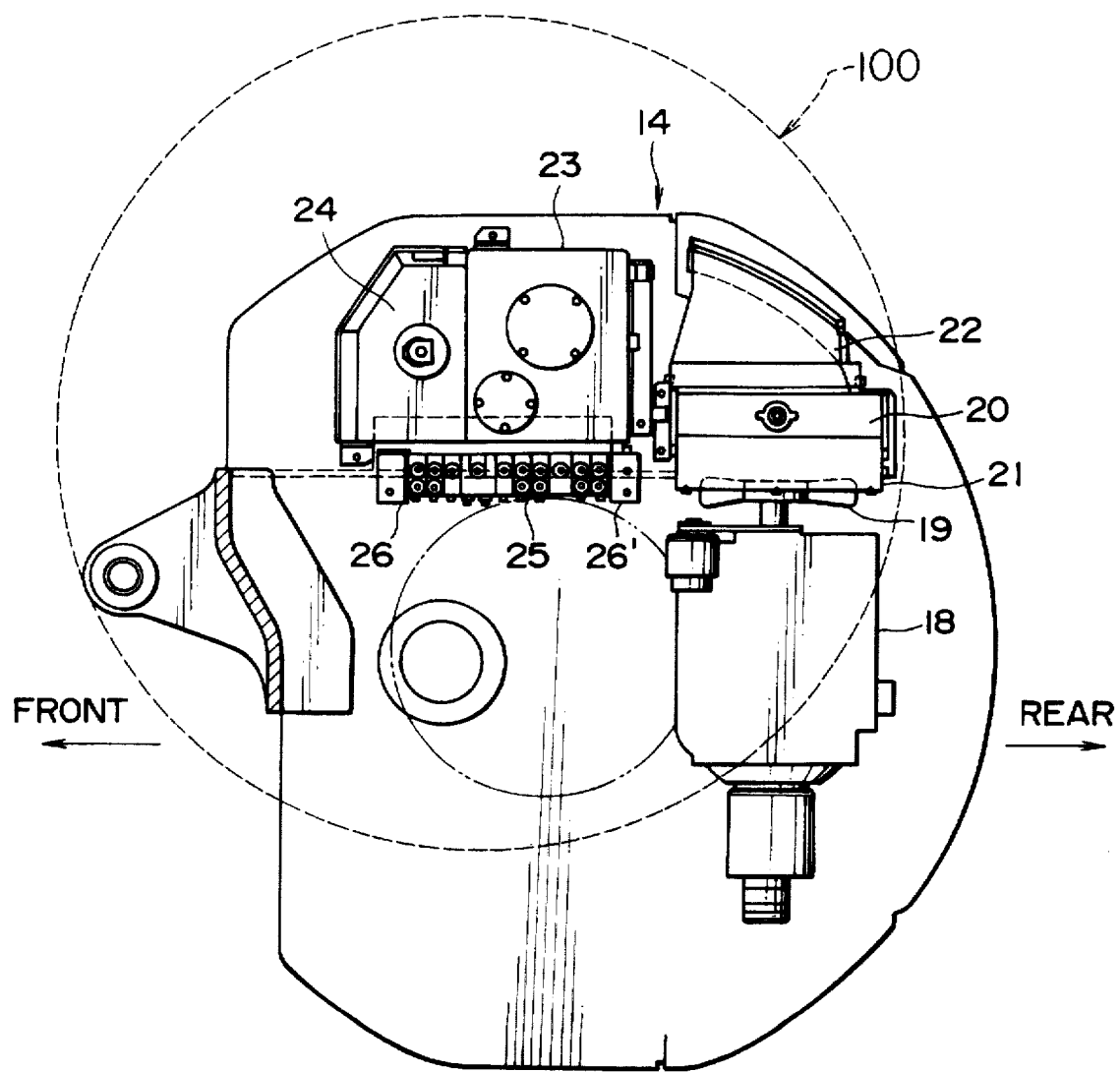
FIG. 2 is a partial, cut-away plan view showing a principal portion of the cooling system disposed in an interior of an upper rotating structure of the hydraulic excavator illustrated in FIG. 1.

FIG. 2 is a partial, cut-away plan view showing a principal portion of the cooling system disposed in the interior of the upper rotating structure 14. In the same figure, the numeral 18 denotes a water-cooled engine, numeral 19 denotes an engine fan, numeral 20 denotes a radiator, numeral 21 denotes a shroud provided on an intake side of the radiator 20, and numeral 22 denotes a duct provided on an exhaust side of the radiator 20. Also in the same figure, numeral 23 denotes a hydraulic oil tank, numeral 24 denotes a fuel tank, numeral 25 denotes control valves controlling hydraulic actuators mounted on the hydraulic excavator, and numerals 26 and 26' denote valve stands for supporting the control valves 25. All of these elements are mounted in the upper rotating structure 14.

Figure 3:
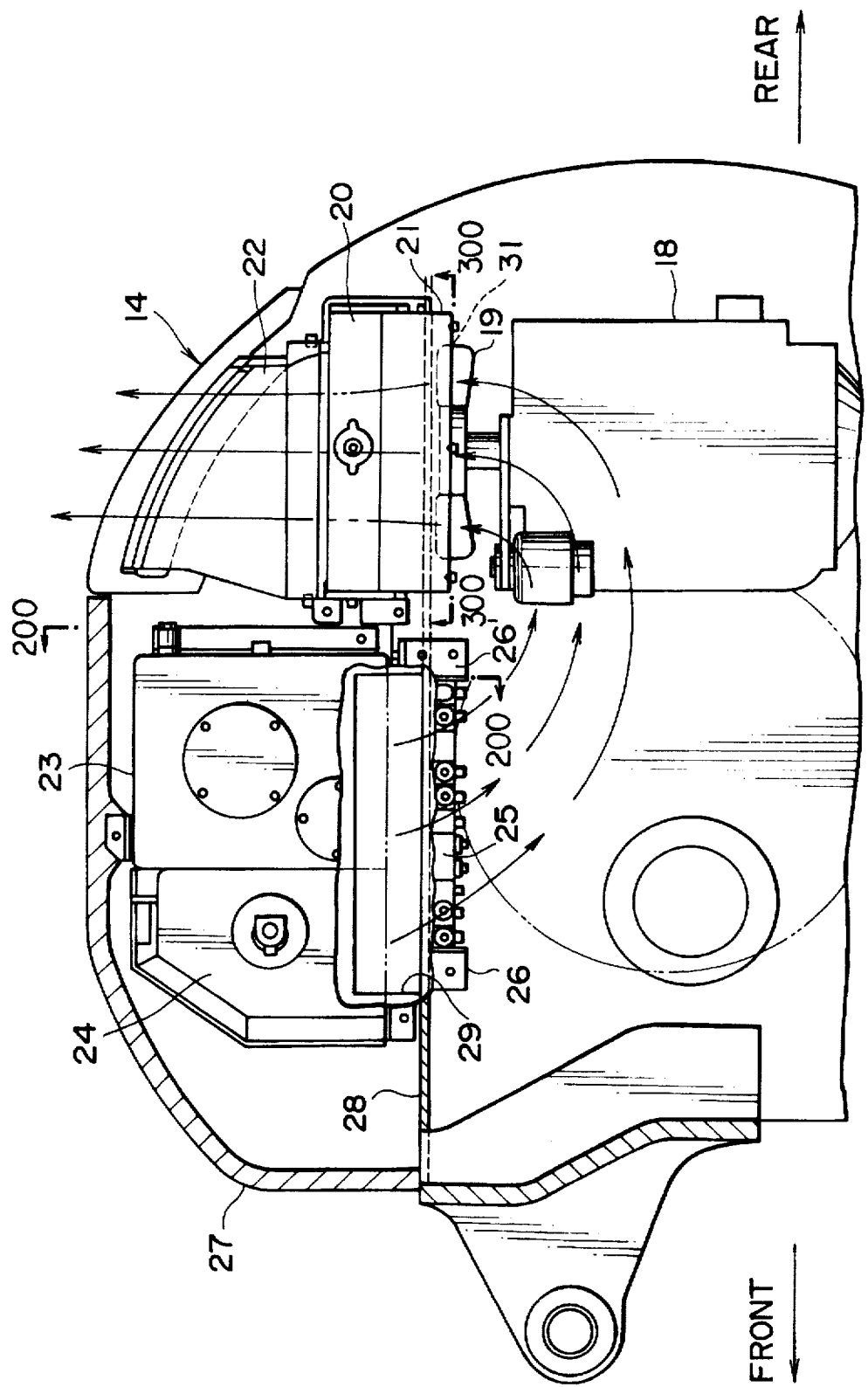
FIG. 3 is a partial, cut-away detail view of a portion indicated by the reference mark 100 in FIG. 2.

FIG. 3 is a partial, cut-away detail view of a portion indicated by the reference mark 100 in FIG. 2. In the same figure, the numeral 27 denotes a frame of the upper rotating structure 14, numeral 28 denotes a longitudinally extending upright plate as a member of the frame 27, and numeral 29 denotes a lower opening.

Figure 4:
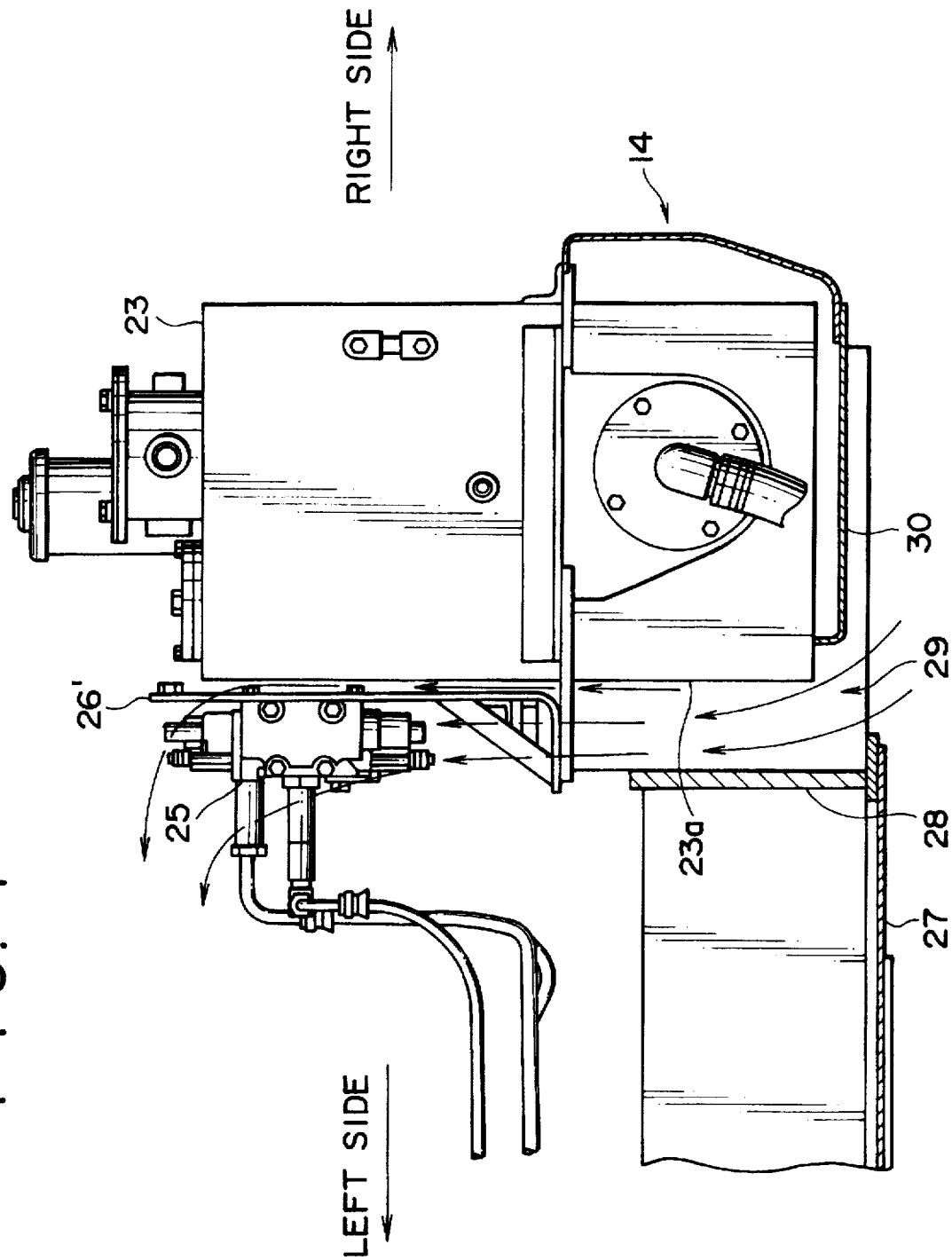
FIG. 4 is a view as seen in the arrowed direction 200—200 in FIG. 3.

FIG. 4 is a view as seen in the arrowed direction 200—200 in FIG. 3. In the same figure, numeral 30 denotes an under cover mounted on a bottom side of a rear portion of the upper rotating structure 14.

Figure 5:
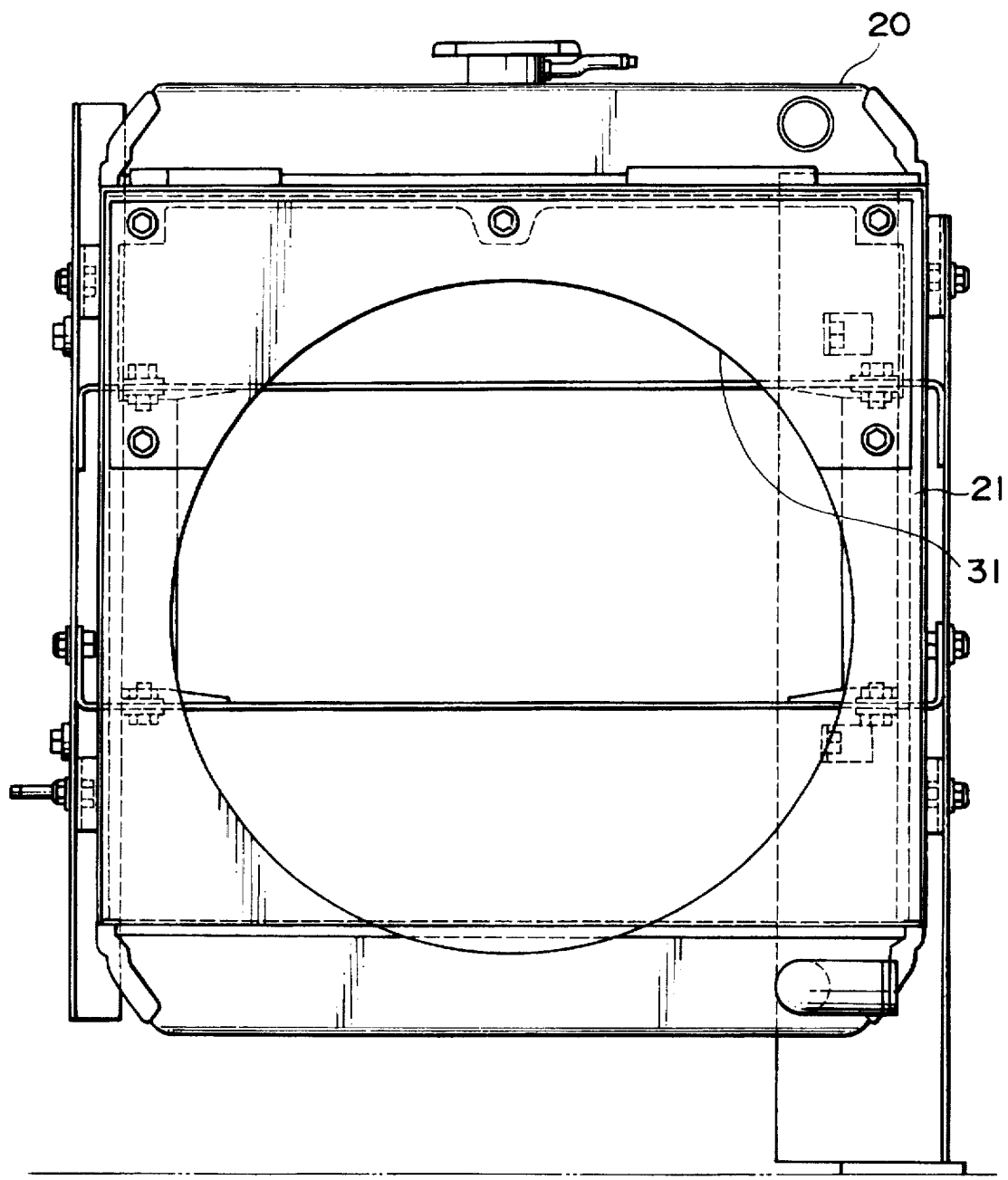
FIG. 5 is a view as seen in the arrowed direction 300—300 in FIG. 3.
Figure 6:
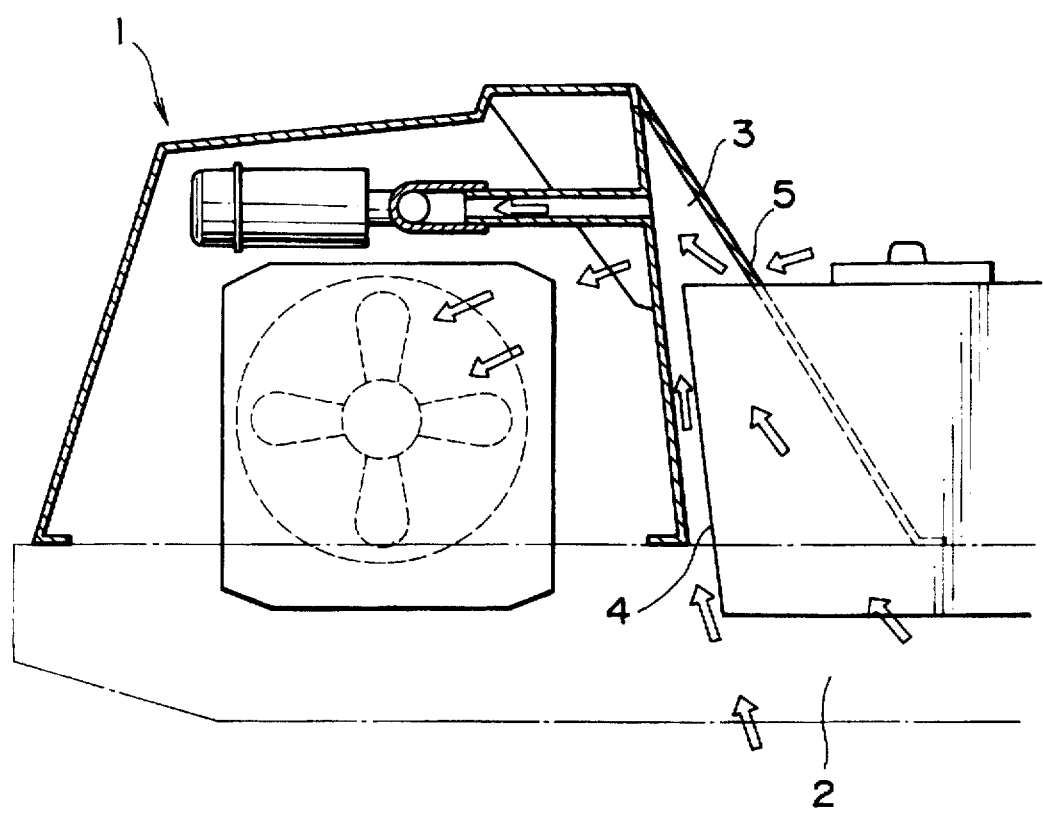
FIG. 6 is a sectional side view showing a part of an upper rotating structure of a conventional small-sized excavator.
Figure 7:
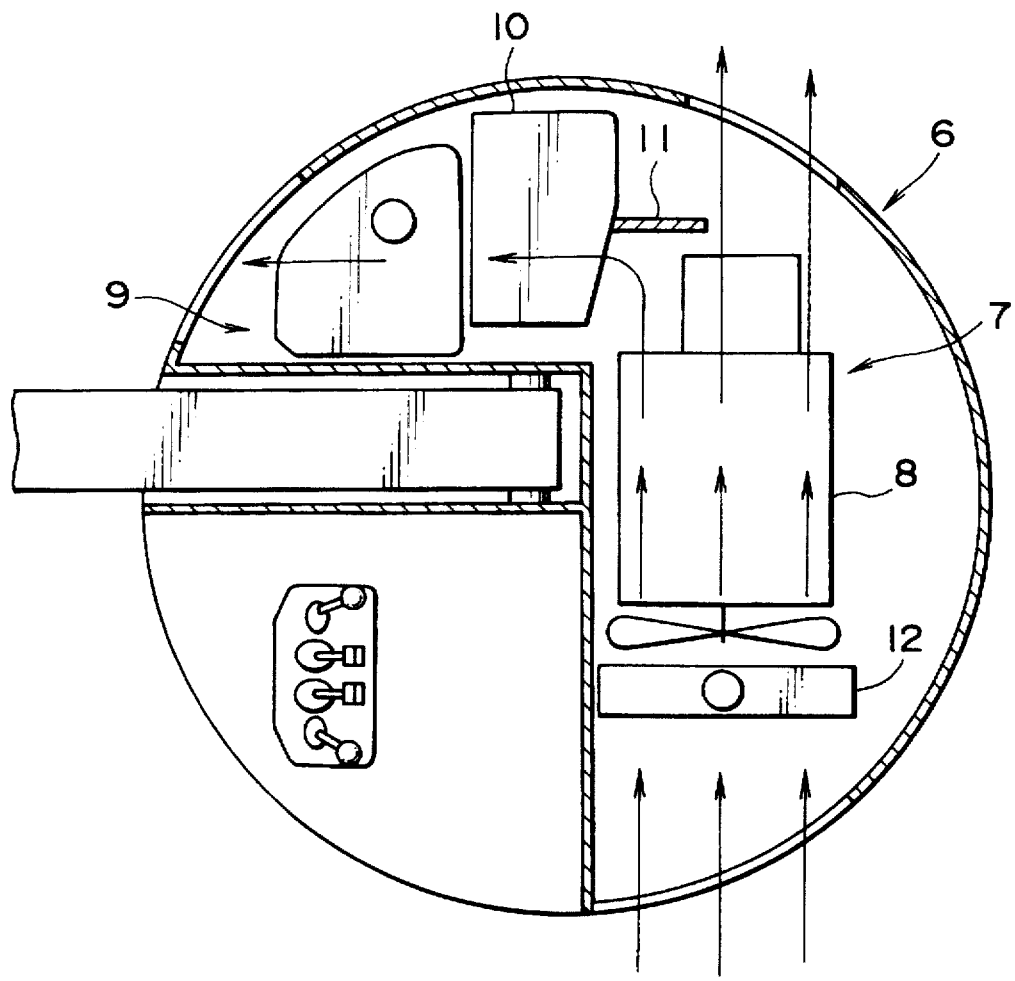
FIG. 7 is a cutaway plan view showing a construction of an upper rotating structure of another conventional small-sized excavator.

FIG. 5 is a view as seen in the arrowed direction 300—300 in FIG. 3. In the same figure, the numeral 31 denotes an opening for the engine fan 19. The opening 31 is formed in a rear surface of the shroud 21.

The construction of the cooling system according to the present invention will now be described with reference to FIGS. 1–5. In the present invention, as shown in FIGS. 2 and 3, the engine 18 and the radiator 20 are mounted in the rear portion of the upper rotating structure 14. The hydraulic oil tank 23 is disposed on the side of the radiator 20. Due to rotation of the engine fan 19 the cooling air is drawn in from only the lower opening 29 formed in the underside of the upper rotating structure 14. The cooling air flows through the path indicated by arrows in FIG. 3, then the cooling air passes through the opening 31 of the shroud 21 past the engine fan 19 and further passes through fins (not shown) of the radiator 20. The cooling air then flows through the duct 22 disposed on the exhaust side of the radiator 20 and is, finally, discharged to the exterior of the hydraulic excavator.

The control valves 25 and the valve stands 26, 26', to which the control valves 25 are secured, are disposed in the above described cooling air flow path. Such an arrangement of components is important, since the control valves 25 which control the hydraulic actuators experience an increase in temperature when the hydraulic oil temperature increases. The lower opening 29 is positioned in the clearance between the upright plate 28 as a member of the frame 27 of the upper rotating structure and an outer surface 23a of the hydraulic oil tank 23. The outer surface 23a faces the central portion of the upper rotating structure 14. The valve stands 26 and 26' are disposed near the outer surface 23a of the tank 23 along which the cooling air flows. Therefore, the cooling air passes the outer peripheral surfaces of the control valves 25.

The operation of the cooling system of this embodiment will now be described. In this embodiment, as the engine fan 19 rotates, the cooling air is directed by induction from only the lower opening 29 of the upper rotating structure 14. The cooling air is introduced upward while being guided by both the upright plate 28 of the frame 27 and the outer surface 23a of the hydraulic oil tank 23 opposed to the upright plate 28. The structure of the lower opening 29 used in this embodiment is simple and economical, not requiring any complicated mechanism. Moreover, in this embodiment, since the hydraulic actuator control valves 25 are located adjacent to the outer surface 23a of the tank 23, the cooling air passes both the tank outer surface 23a and the outer peripheral surfaces of the control valves 25. As a result, the hydraulic oil tank 23 and the control valves 25 are cooled by the cooling air. Thus, it is possible to reduce the temperature of the hydraulic oil and improve the maintainability of hydraulic devices (control valves 25 and other hydraulic devices not shown).

I claim:

1. A cooling system in construction equipment, comprising:

an upper rotating structure;

an engine mounted in a rear portion of said upper rotating structure, said engine having an engine fan;

a radiator disposed proximate to said engine fan;

a hydraulic oil tank disposed beside said engine;

control valves for controlling hydraulic actuators, said control valves being disposed on a side face of said hydraulic oil tank; and a lower opening formed in an underside of said upper rotating structure and below said control valves, through which lower opening air for cooling said control valves is drawn in with rotation of said engine fan.

2. A cooling system in construction equipment according to claim 1, wherein said lower opening is located below a clearance formed between an upright plate which is a constituent of a frame of said upper rotating structure and the side of said hydraulic oil tank.

3. A cooling system in construction equipment according to claim 1, wherein the air for cooling the control valves is supplied from only said lower opening.

4. A cooling system in construction equipment according to claim 1, wherein said control valves are attached to a valve stand fixed to said upper rotating structure.

5. A cooling system in construction equipment according to claim 1, wherein a duct is provided on an exhaust side of said radiator, and the cooling air is discharged through said duct to an exterior of said upper rotating structure.

* * * * *